United States Patent [19]

Yariv et al.

[11] 3,842,289

[45] Oct. 15, 1974

[54] THIN FILM WAVEGUIDE WITH A PERIODICALLY MODULATED NONLINEAR OPTICAL COEFFICIENT

[75] Inventors: Ammon Yariv; Sasson R. Somekh, both of Pasadena, Calif.

[73] Assignee: California Institute of Technology, Pasadena, Calif.

[22] Filed: May 18, 1973

[21] Appl. No.: 361,536

[52] U.S. Cl.......... 307/88.3, 321/69 R, 350/96 WG
[51] Int. Cl............................................... H03f 7/04
[58] Field of Search................. 307/88.3; 321/69 R; 350/96 WG

[56] References Cited
UNITED STATES PATENTS
3,384,433   5/1968   Bloembergen.................... 307/88.3

Primary Examiner—Herman Karl Saalbach
Assistant Examiner—Darwin R. Hostetter
Attorney, Agent, or Firm—Lindenberg, Freilich, Wasserman, Rosen & Fernandez

[57] ABSTRACT

A phase matched thin film waveguide supportive of electromagnetic wave energy having angular frequencies is disclosed. In one embodiment, the waveguide includes a sequence of strips each of length A/2 in the direction of wave energy propagation and spaced apart from one another a distance A/2, $A = 2\pi/\Delta\beta$, where $\Delta\beta$ is the phase constant difference required to satisfy the relationship $\beta_1 + \beta_2 = \beta_3 + \Delta\beta$, $\beta_1$, $\beta_2$ and $\beta_3$ being, to a first order of approximation, the phase constants respectively of the wave energy. In other embodiments, the spaces between the strips are filled with materials whose nonlinear optical coefficient is either zero or different from the nonlinear optical coefficient of the spaced apart strips. The filling material's index of refraction is substantially equal to that of the spaced apart strips.

12 Claims, 4 Drawing Figures

PATENTED OCT 15 1974 3,842,289
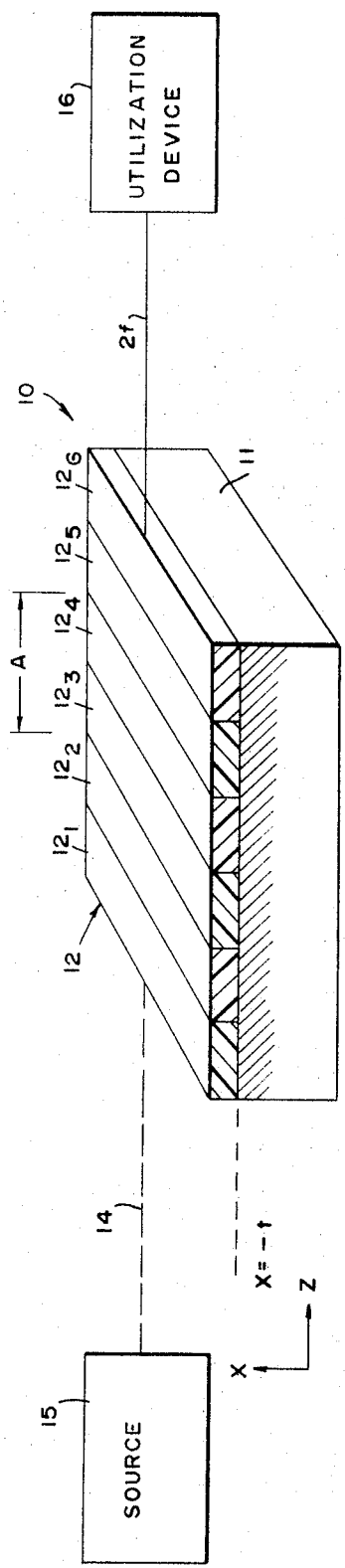

THIN FILM WAVEGUIDE WITH A PERIODICALLY MODULATED NONLINEAR OPTICAL COEFFICIENT

ORIGIN OF INVENTION

The invention herein described was made in the course of or under a contract with the Office of Naval Research and Department of the Army.

BACKGROUND OF THE INVENTION

1. Field of the Invention

The present invention relates to thin film devices, and more particularly, to a parametric device with a thin film waveguide whose nonlinear optical coefficient is periodically modulated along the direction of wave energy propagation for phase matching purposes.

2. Description of the Prior Art

In recent years, considerable attention has been given to the field of thin film optics. One of the most important features of a thin film guide is that due to its very small waveguide cross section area, small input power can cause very large optical power densities, so that nonlinear optical interactions become very efficient. Such interactions can be used to produce second harmonic generation, parametric oscillation and frequency up conversion. Unfortunately, many materials which have nonlinear optical properties cannot be used directly since therein the waves involved in the nonlinear interaction are not phase matched, i.e., they travel with velocities which cause destructive interference. Thus, in order to use such materials, they have to be phase matched, so that they generate new waves, generally thought of as spatial harmonics, with new phase velocities for proper nonlinear optical interaction. Some materials are phase matchable by a well known birefringent technique. However, some thin film materials such as GaAs and GaP which possess high nonlinear optical coefficients are not phase matchable by the conventional birefringent technique.

In U.S. Pat. No. 3,619,796, techniques other than the birefringent technique for producing phase matching in a thin film waveguide are disclosed. One of the techniques consists of placing a fixed grating upon the surface of the thin film guide. A quantitative analysis of the disclosed arrangement reveals that the power conversion efficiency for a given length of such a guide is quite small. Therefore, even though phase matching is theoretically achievable with the grating, the usefulness of the guide as part of a parametric device is quite limited. Also, the need for a separate mechanical grating on the thin film guide is quite undesirable both from overall size and cost points of view.

OBJECTS AND SUMMARY OF THE INVENTION

It is a primary object of the present invention to provide a new thin film waveguide in which phase matching is achieved by a novel arrangement.

Another object of the invention is to provide a thin film waveguide with high conversion efficiency.

A further object of the invention is to provide a new thin film guide for use as part of an optical parametric device with unique nonlinear optical properties along the propagation direction.

These and other objects of the invention are achieved by providing a thin film guide in which phase matching is achieved by periodically modulating its nonlinear optical coefficient with a period of length A along the direction of wave energy propagation. The period A is chosen so that $\Delta\beta = 2\pi/A$, where $\Delta\beta$ is the phase constant difference required to satisfy the phase relationship $\beta_1 + \beta_2 = \beta_3 + \Delta\beta$, where $\beta_1, \beta_2$ and $\beta_3$ are to a first order of approximation of the phase constants, respectively of electromagnetic wave energy which is supportive by the guide with angular frequencies $\omega_1, \omega_2$ and $\omega_3$ where $\omega_1 + \omega_2 = \omega_3$.

Designating the length of the first section of period A by $d_a$ and the second section period by $d_b$ where $A = d_a + d_b$, the nonlinear optical coefficient of the guide is periodically modulated by constructing it so that along each length $d_a$ it exhibits a high nonlinear optical coefficient and along each length $d_b$ the nonlinear optical coefficient is different from that of the coefficient in the preceding section of the period. In one embodiment, the periodic modulation of the nonlinear optical coefficient is realizable by forming the guide as a sequence of spaced apart strips each of length $d_a$ and of a material e.g., GaAs in a form, e.g., crystalline with a high nonlinear optical coefficient. The strips are spaced apart a distance $d_b$, wherein the nonlinear optical coefficient is zero. Thus, over each period A, the nonlinear optical coefficient varies between the nonlinear optical coefficient value of the strip and zero. The guide may also be formed as a sequence of adjacent strips in which the odd strips have a length of $d_a$ and a nonlinear optical coefficient which is different from the nonlinear optical coefficient of the even strips, which have the length of $d_b$. Theoretically, optimum performance is achieved when the polarity of the nonlinear optical coefficient of the even strip is opposite the polarity of the nonlinear optical coefficient of the odd strips.

The novel features of the invention are set forth with particularity in the appended claims. The invention will best be understood from the following description when read in conjunction with the accompanying drawings.

BRIEF DESCRIPTION OF THE DRAWINGS

FIG. 1 is an isometric view of a second harmonic generator incorporating the novel waveguide of the present invention;

FIG. 2 is a partial side view of another embodiment of the invention; and

FIGS. 3 and 4 are diagrams useful in analyzing the performance of the waveguide of the present invention.

DETAILED DESCRIPTION OF THE PREFERRED EMBODIMENTS

The present invention will be described in connection with second harmonic generation. However, as will be apparent to those familiar with the art, the novel phase matching technique employed herein is applicable for parametric oscillation or frequency upconversion. Attention is directed to FIG. 1 wherein numeral 10 designates a waveguide structure consisting of a substrate 11 which supports on the top thereof a thin film waveguiding strip 12 hereafter referred to as the thin film guide. Electromagnetic wave energy designated by dashed line 14, at a frequency f from a source 15 is directed to the thin film guide 12 which is phasematched in accordance with the present invention so that it produces an output at a frequency 2f which is received by a utilization device 16. The indices of refraction of the thin film strip 12 and the substrate 11 are designated $n_2$ and $n_3$, respectively, $n_1 > n_2$, so that the electromagnetic wave propagation is effectively confined to the thin film guide 12.

As previously pointed out in the present invention, phase matching is achieved by periodically modulating the nonlinear optical coefficient or properties of the thin film guide 12 with a period of length A along the propagation direction, designated as axis $z$ in FIG. 1. The period A is chosen so that $\Delta\beta = 2\pi/A$, where $\Delta\beta$ is the phase constant difference which has to be made equal to zero for proper phase matching.

In one embodiment of the invention, as shown in FIG. 1, the periodic modulation of the nonlinear optical coefficient is achieved by forming the thin film guide 12 as a sequence of strips. In FIG. 1, only six strips are shown and are designated by numerals $12_1$ – $12_6$, although in practice, the number of strips is much larger than six. The strips are arranged so that over any period of length A, the guide 1 includes one strip, such as $12_3$ of length $d_a$ which has a high nonlinear optical coefficient and one strip, such as $12_4$ of length $d_b = A - d_a$ which does not have a nonlinear optical coefficient or whose nonlinear optical coefficient differs from that of strip $12_3$. For explanatory purposes, it is assumed that the nonlinear optical coefficient of strips $12_2$, $12_4$ and $12_6$ is zero.

Stated differently, the guide 12 is formed as a sequence of strips in which every other strip, e.g., each odd strip ($12_1$, $12_3$, etc.) possesses a high nonlinear optical coefficient while each even strip ($12_2$, $12_4$, etc.) which occupies the space between two strips with the high nonlinear optical coefficients is characterized by the absence of nonlinear optical coefficient. Thus, in the direction of propagation $z$, the nonlinear optical coefficient of the guide 12 varies periodically from a high value in each odd strip to zero in each even strip. One way of implementing such a guide is to form the odd strips from an appropriate material in a form with a high nonlinear optical coefficient, e.g., GaAs in crystalline form, wjile the even strips consist of the same material in the amorphous or polycrystalline form. Such a guide of a thickness of 20 microns ($\mu$) and a periodicity $A = 180\mu$, provided very satisfactory phase matching when used as a second harmonic generator providing an output signal at a wavelength of $5.3\mu$ in response to an input signal with a wavelength of $10.6\mu$.

If all the strips have the same index of refraction, the length of all the strips is substantially the same, i.e., $d_a \approx d_b$. If, however, the index of refraction of the two kinds of strips is not the same, the length of the two kinds of strips may not be the same. A zero order approximation for the period A is given by:

$$A = d_a + d_b = \pi/\Delta\beta_a + \pi/\Delta\beta_b$$

where $\Delta\beta_a$ and $\Delta\beta_b$ are the phase constant differences in the two kinds of strips defined by:

$$\beta_{1a} + \Delta_{2a} = \beta_{3a} + \Delta\beta_a, \beta_{1b} + \beta_{2b} = \beta_{3b} + \Delta\beta_b$$

The same phase matching effect is achievable by eliminating the even strips thereby forming the guide 12 only as a sequence of strips each with a high nonlinear optical coefficient, with the strips being spaced apart from each other a distance equal to each strip length as shown in FIG. 2. Therein, the strips, each $d_a$ long, are designated by $12a$–$12c$ and the spaces, each $d_b$ long in the $z$ direction, are designated by $12d$–$12f$. Again $A = d_a + d_b$.

Since the thickness of the guide 12 is the $x$ direction is very small, generally in the order of a few microns, the guiding layer of the substrate 11 is readily accessible from the top surface of thin film guide 12. Thus, one technique of forming the guide 12 is to first grow it on top of the substrate 11 as a single thin film crystal and thereafter use an ion milling technique, which is known, to form the spaces $12d$–$12f$ as a series of grooves normal to the propagation direction. The grooves may be sputter-filled with the amorphous, or polycrystalline form of the film material to form the even strips herebefore discussed in connection with FIG. 1.

The grooves may also be filled to form the even strips with some material other than the film material which does not possess a nonlinear optical coefficient or with a material whose nonlinear optical coefficient differs from that of the strips formed from the original thin film deposited on the substrate, and one with an index of refraction which is similar to that of the film material. Theoretically, the effect of the periodic modulation of the nonlinear optical coefficient of the guide 12 may be increased by forming the guide as a sequence of strips as shown in FIG. 1 in which all strips have a nonlinear optical coefficient except that the odd and even strips in the sequence have nonlinear optical coefficients of opposite polarities. Thus, instead of filling the grooves (or spaces $12d$–$12f$) with a material in a form which does not possess a nonlinear optical coefficient they may be filled with a material in a form which has a nonlinear optical coefficient of a polarity opposite to the polarity of the nonlinear optical coefficient of the odd strips. For proper operation, it is desirable that the top surface of the thin film guide 12, whether or not the grooves are filled, be smooth to insure constant guide thickness.

The advantages of the period modulation of the nonlinear optical coefficient in accordance with the present invention, to achieve phase matching may better be appreciated by directing attention to the following analysis.

Let us consider, for the sake of simplicity, a second harmonic generation in the dielectric waveguide shown in FIG. 3, in which elements previously referred to are designated by like numerals. The electric field of the nth TE guided mode, as an example, is given by the following expression:

$$E_n{}^\omega (x, z, t) = A_n{}^\omega \epsilon_n{}^\omega (x) \exp[i(\omega t - \beta_n{}^\omega z)]. \quad (1)$$

The propagation phase constant $\beta_n{}^\omega$ as well as the lateral mode profile $$\xi_n{}^\omega(x) \left( \int_{-\infty}^{\infty} |\xi_n{}^\omega(x)|^2 dx = 1 \right)$$

are determined by the frequency, $\omega$, the mode number $n$, the guide index $n_2(\omega)$, the substrate index $n_3(\omega)$ and the guide thickness $t$. The mode amplitude $A_n{}^\omega$ represents the power $P_n{}^\omega$ carried by the mode and is given by $|A_n{}^\omega|^2 = 2\omega\mu P_n{}^\omega/W\beta_n{}^\omega,$ (2)

where W is the width of th waveguide in the $y$ direction. $\beta_n{}^\omega$ varies between the bulk guide and substrate wave numbers $$n_3(w)k_0 < \beta_n{}^\omega < n_2(\omega)k_0, \quad (3)$$

where $k_0 \equiv 2\pi/\lambda_0$ is the free space wave number. For large $t$ and small mode number $\beta_n{}^\omega$ approaches the upper limit, while the lower limit is approached by reducing the thickness $t$ or choosing a higher number mode. The electric field of the second harmonic mth mode is given similarly:

$$E_m{}^{2\omega}(x,z,t) = A_m{}^{2\omega}\epsilon_m{}^{2\omega}(x)\exp[i(2\omega - \beta_m{}^{2\omega}z)] \quad (4)$$

and the value for $\beta_m{}^{2\omega}$ is confined between the two limits $$n_3(2\omega)2k_0 < \beta_m{}^{2\omega} < n_2(2\omega)2k_0. \quad (5)$$

The second harmonic polarization generated by the fundamental $E_n{}^\omega(x,z,t)$ is taken as $P^{2\omega}(x,z,t) = d_{NL}(x)(A_n{}^\omega)^2[\epsilon_0(x)]^2 \exp[i(2\omega t - 2\epsilon_n{}^\omega z)]$ (6) where $d_{NL}(x)$ is the appropriate bulk nonlinear tensor element. This polarization drives the second harmonic radiation, thus the rate of growth of the average power in the mth second harmonic mode is given by:

$$dP_m{}^{2\omega}/dz = \omega W \, Im \int_{-\infty}^{\infty} E_m{}^{2\omega}(\rho^{2\omega})^* dx. \quad (7)$$

Substituting (4) and (6) in (7) yields $$dP_m{}^{2\omega}(z)/dz = \omega W \, Im\left\{(A_n{}^\omega)^2 A_m{}^{2\omega}(z) \exp[-i(\beta_m{}^{2\omega} - 2\beta_n{}^\omega)z]\right.$$
$$\left. \times \int_{-\infty}^{\infty} d_{NL}(x)[\xi_n{}^\omega(x)]^2 \xi_m{}^{2\omega}(x) dx\right\}. \quad (8)$$

Equation (8) readily gives the two requirements needed for effective nonlinear interaction. The first requirement is the well known phase matching condition which arises from the need to eliminate the oscillating exponential term in the differential equation (8). The condition is:

$$\Delta\beta = \beta_m{}^{2\omega} - 2\epsilon_n{}^\omega = 0 \quad (9)$$

The second requirement for a high rate of second harmonic power growth is a large value for the overlap integral of the fundamental intensity mode profile and the second harmonic field profile in equation (8).

$$\int_{-\infty}^{\infty} d_{NL}(x)[\xi_n{}^\omega(x)]^2 \xi_m{}^{2\omega}(x) dx. \quad (10)$$

Under certain conditions, namely, $n_2(\omega) < n_3(2\omega)$ it is possible to compensate for the normal dispersion of th material and to phase match by choosing the right thickness $t$ and the mode numbers $n$ and $m$. However, this usually requires accurate control of the thickness and for $n \neq m$ involves a large decrease in the magnitude of the overlap integral (10) thus reducing the effective nonlinear coefficient for the interaction.

To overcome the problem of $\Delta\beta \neq 0$ in a thin film structure, let us consider the waveguide 12 shown in FIG. 4. The nonlinear coefficient of the thin film guide 12 is modulated periodically with a period $\Lambda$, while the index of refraction is assumed to remain unchanged. To analyze the new situation we note that the nonlinear coefficient $d_{NL}$ in (8) is now a function of $z$ as well as of $x$. We limit ourselves to the case where the fundamental and the second harmonic are well confined zero order modes. This makes it possible to neglect the $x$ dependence of $d_{NL}$ so that (8) can be written as $$dP_0{}^{2\omega}(z)/dz = \omega W \, Im\left\{(A_0{}^\omega)^2 A_0{}^{2\omega}(z)\right.$$
$$\times \left[\int_0^t [\xi_0{}^\omega(x)]^2 \xi_0{}^{2\omega}(x) dx\right]$$
$$\left. \times \exp(i\Delta\beta z)d_{NL}(z)\right\}. \quad (11)$$

If the spatial modulation period $\Lambda$ is chosen equal to $$2\pi/\Lambda = \Delta\beta, \quad (12)$$

the fundamental component in the Fourier expansion of $d_{NL}(z)$ will provide a term with an exponential dependence of $\exp(-i\Delta\beta z)$. This term, by multiplying the $\exp(i\Delta\beta z)$ in (11) gives rise to a synchronous contribution that allows the cumulative buildup of the second harmonic power. The amplitude of this particular term in the expansion $d_{NL}(z)$ determines the effectiveness of the interaction. To be specific, consider an example with $$d_n' = d_{NL}, \quad d_b' = 0, \quad (13)$$

where $d_{NL}$ is the original nonlinear coefficient of the guide 12, and where the period $\Lambda$ is chosen so that (12) is satisfied. It should be pointed out that $d_n'$ and $d_b'$ as shown in FIG. 4 represent the nonlinear coefficients of adjacent strips and not their relative lengths along the $z$ axis. Their lengths can be thought of as $d_a$ and $d_b$ where $d_a + d_b = \Lambda$. The Fourier expansion of this rectangular form nonlinear coefficient is:

$$d_{NL}(z) = 1/2 d_{NL} + \sum_{m=odd} \frac{2d_{NL}}{m\pi} \sin\left(\frac{2\pi m}{\Lambda}z\right). \quad (14)$$

Using (14) and (12) in (11) and keeping the synchronous term only leads to $$dP_0{}^{2\omega}/dz = \omega W (A_0{}^\omega)^2 A_0{}^{2\omega}(z)$$
$$\times \left[\int_0^t [\xi_0{}^\omega(x)]^2 \xi_0{}^{2\omega}(x) dx\right] \frac{d_{NL}}{\pi}. \quad (15)$$

The modes overlap integral reaches an optimum value when the modes are well confined and equals approximately $t^{-1/2}$. Using (2) to express $A_0{}^\omega$ and $A_0{}^{2\omega}$ in terms of the respective mode powers (15) becomes $$dP_0{}^{2\omega}(z)/dz = 4\omega^{5/2}\mu^{3/2}P_0{}^\omega/\beta_0{}^\omega(\beta_0{}^{2\omega})^{1/2}(Wt)^{1/2} d_{NL}/\pi$$
$$[P_0{}^{2\omega}(z)]^{1/2}. \quad (16)$$

A simple manipulation of (16) where $\beta_0{}^\omega$ and $\beta_0{}^{2\omega}$ are assumed to be equal to the bulk propagation constants gives in the nondepleted pump approximation:

$$P_0{}^{2\omega}(l)/P_0{}^\omega = 2\omega^2 d_{eff}{}^2 l^2 / [n_2(\omega)]^2 n_2(2\omega)$$
$$(\mu_0/\epsilon_0)^{3/2} \, P^\omega/Wt. \quad (17)$$

This result is of a form identical to the bulk interaction except that here the effective nonlinear coefficient is $$d_{eff} = d_{NL}/\pi \quad (18)$$

The conversion efficiency from $\omega$ to $2\omega$ is seen to be proportional to the mode power density $P_0{}^\omega/Wt$. Since $W$ and $t$ can be made comparable to $\lambda$ this power density can become very large even for small power input. The penalty for modulating $d_{NL}$ in order to phase match is a reduction of the effective nonlinear coefficient by a factor of $1/\pi$.

A physical picture of the way in which the spatial modulation of $d_{NL}$ overcomes the problem of phase matching is the following. When $\Delta\beta \neq 0$ the generated second harmonic wave and the second harmonic polarization driving it drift gradually (with distance) apart in phase. When $\Delta\beta z = \pi$ the accumulated phase shift is $\pi/2$ and power begins to flow back from the second harmonic to the fundamental. This happens after one coherence length $l_c \equiv \pi/\Delta\beta$. By having $d_{NL}$ equal to zero between $z=l_c$ and $z=2l_c$ the reversal of power flow is prevented. By $z = 2l_c$ the accumulated phase shift has returned to the favorable region $(-1/2\pi < \phi < 1/2\pi)$ and the nonlinear interaction is "turned on" $(d_{nl} \neq 0)$ again. The reduced value of $d_{eff}$ as given by (18) reflects the fact that not all the physical length of the structure partakes in the interaction.

The practical implementation of the modulation of $d$ seems feasible with presently available techniques, since the guiding layer extends only a few microns below the surface and therfore is readily accessible. One approach is to use ion-milling to fabricate a series of grooves normal to the propagation direction in a single crystal thin film guide and then sputter-fill the grooves with a polycrystalline form of the film material (for which $d_{NL} = 0$) or with some other material with a similar index of refraction.

It should be clear that a reversal of the sign of $d_{NL}$ in the second half of each period results in the doubling of the value of $d_{eff}$. This is achievable by forming guide 12 so that each odd strip has a nonlinear optical coefficient of one polarity and each even strip, a nonlinear optical coefficient of an opposite polarity.

It should be apparent that although the invention has been described in connection with second harmonic generation, the teachings are equally applicable for phase matching the thin film guide for use in a parametric oscillator or a frequency up converter.

In summary the present invention provides a new phase matched thin film guide for use in any parametric device. The thin film guide is supportive of electromagnetic wave energy having angular frequencies $\omega_1$, $\omega_2$ and $\omega_3$ where $\omega_1 + \omega_2 = \omega_3$. When used as a second harmonic generator $\omega_1 = \omega_2$, so that $\omega_3 = 2\omega_{1.1}$, $\beta_2$, and $\beta_3$ are to a first order approximation, the phase constants, respectively, of the wave energy. The thin film guide is formed so that its nonlinear optical coefficient is periodically modulated over each period length A, where $\Delta\beta = 2\pi/A$, and $\Delta\beta$ is the phase difference required to satisfy the relationship $\beta_1 + \beta_2 = \beta_3 + \Delta\beta$.

The periodic modulation is achieved by forming the guide as a sequence of strips each of length $d_a$ in the direction of propagation and of a selected material in a form, e.g., crystalline, having a large nonlinear optical coefficient. These strips are spaced apart a distance $d_b$ where $A = d_a + d_b$. The strips are formed by first depositing a thin film in crystalline form on a substrate and thereafter milling grooves of width $d_b$ spaced apart a distance $d_a$. The groove spaces when unfilled exhibit a nonlinear optical coefficient of zero in the direction of propagation. Thus, over each period A, the nonlinear optical coefficient is high as represented by the strip's nonlinear optical coefficient and zero in the following space. If desired, the spaces may be filled with a material whose nonlinear optical coefficient is zero.

In practice, the phase matched guide can be formed of one material, with the strips in crystalline form and the grooves filled with the same material in amorphous or polycrystalline form. The grooves can also be filled with a different material having a zero nonlinear optical coefficient, or having a nonlinear optical coefficient significantly different from the nonlinear optical coefficient of the first formed strips.

In any of these cases, the guide can be thought of as formed of a non-uniform material. It is clearly non-uniform when the grooves are filled by a material different from that of the strips, which are formed from the originally deposited thin film. It is also of non-uniform material even if the grooves are filled with the same material as the strips since the latter are in crystalline form and the grooves are filled with the material in other than crystalline form with a zero nonlinear optical coefficient. Even when the grooves are not filled with any material, the guide, consisting of only spaced apart strips, can be thought of as being of a non-uniform, namely non-continuous, material. It is clear that when the spaces consist of any material in a form so that it exhibits a nonlinear optical coefficient of a polarity opposite the polarity of the nonlinear optical coefficient of the original strips, the guide is of a non-uniform material.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A parametric device including:
   a non-uniform nonlinear thin film waveguide supportive of electromagnetic wave energy having angular frequencies $\omega_1$, $\omega_2$ and $\omega_3$ where $\omega_1 + \omega_2 = \omega_3$, said waveguide comprising a substrate defining a top surface and at least a first group of spaced apart strips of a first material in a form having a nonlinear optical coefficient on the top surface of said substrate, each strip having a length $d_a$ in the direction of energy propagation, with adjacent strips of each said first group being spaced apart a distance $d_b$, where $d_a + d_b = A$ and $A = 2\pi/\Delta\beta$, $\Delta\beta$ being the phase difference required to satisfy the phase relationship $\beta_1 + \beta_2 = \beta_3 + \Delta\beta$ and $\beta_1$, $\beta_2$ and $\beta_3$ are to a first order of approximation, the phase constants respectively of said wave energy, the indicies of refraction of said strips and said substrate being definable as $n_2$ and $n_3$ where $n_2 < n_3$.

2. The parametric device as described in claim 1 wherein said waveguide further includes a second group of spaced apart strips on the top surface of said substrate, each of length $d_b$ with said first and second groups of strips being in one sequence of strips in which the odd strips consist of said first group and the even strips consist of said second group, each strip in said second group being of a material and in form which is characterized by the absence of a nonlinear optical coefficient.

3. The parametric device as described in claim 2 wherein said strips of said second group are of said first material in a form different from the form of the strips in said first group.

4. The parametric device as described in claim 2 wherein said strips of said second group are of a material different from said first material.

5. The parametric device as described in claim 1 wherein said waveguide further includes a second group of spaced apart strips on said top surface of said substrate, each strip being of a length $d_b$ with said first and second groups of strips being in one sequence of strips in the direction of energy propagation, with the odd and even strips in the seqence consisting of said first and second groups of strips, respectively, each even strip being of a material and in a form which is characterized by a nonlinear optical coefficient which is different from that of the odd strips.

6. The parametric device as described in claim 5 wherein each even strip is of a material and form characterized by a nonlinear optical coefficient which is other than zero.

7. The parametric device ao described in claim 6 wherein the nonlinear optical coefficient of each even strip is characterized by a polarity which is opppsoite the polarity of the nonlinear optical coefficient of the odd strips.

8. The parametric device as described in claim 1 wherein A is in the range of one hundred to a few hundred microns.

9. The parametric device as described in claim 8 wherein the thickness of said strips in a direction perpendicular to the direction of energy propagation is of the order of not more than several tens of microns.

10. The parametric device as described in claim 2 wherein A is in the range of one hundred to a few hundred microns.

11. The parametric device as described in claim 5 wherein A is in the range of one hundred to a few hundred microns.

12. A parametric device including: a non-uniform nonlinear thin film waveguide supportive of electromagnetic wave energy having angular frequencies $\omega_1$, $\omega_2$ and $\omega_3$ where $\omega_1 + \omega_2 = \omega_3$, said waveguide comprising a substrate defining a top surface and a single group of spaced apart strips of a first material in a form having a nonlinear optical coefficient, each strip having a length $d_a$ in the direction of energy propagation, with adjacent strips of said first group being spaced apart a distance $d_b$, where $d_a + d_b = A$ and $A = 2\pi/\Delta\beta$, $\Delta\beta$ being the phase difference required to satisfy the phase relationship $\beta_1 + \beta_2 = \beta_3 + \Delta\beta$ and $\beta_1$, $\beta_2$ and $\beta_3$ are to a first order of approximation, the phase constants respectively of said wave energy, said strips and said substrate being characterized by indicies of refraction definable as $n_2$ and $n_3$ respectively, where $n_2 < n_3$.

* * * * *

UNITED STATES PATENT OFFICE
CERTIFICATE OF CORRECTION

Patent No. 3,842,289                    Dated October 15, 1974

Inventor(s) Amnon Yariv, et al

It is certified that error appears in the above-identified patent and that said Letters Patent are hereby corrected as shown below:

Column 3
    line 2, change "$n_1 > n_2 >$" to $n_2 > n_3$--
    line 20, change "1" to --12--
    line 41, change "wjile" to --while--
    line 60 change "$\beta_{1a} + \Delta_{2a}$" to --$\beta_{1a} + \beta_{2a}$--

Column 4
    line 3, change "is" to --in--
    line 51, in equation (1) change "$\varepsilon_n^\omega$" to --$\xi_n^\omega$--
    line 65, change "th" to --the--

Column 5
    line 10, in equation (4) change "$\varepsilon_m^{2\omega}$" to --$\xi_m^{2\omega}$-- and change "$[i2\omega - \beta_m^{2\omega} z]$" to --$[i2\omega t - \beta_m^{2\omega} z]$--
    line 22, in equation (6) change last term "$2\varepsilon_n^\omega z$" to --$2\beta_n^\omega z$--
    line 45, in equation (9) change "$2\varepsilon_n^\omega$" to --$2\beta_n^\omega$--
    line 57 change "$n_2(\omega) < n_3(2\omega)$" to --$n_2\omega > n_3(2\omega)$--

Column 6
    line 1, change "A" to --$\Lambda$--
    In line of text between equations (11) and (12) change "A" to --$\Lambda$--
    line 32, in equation 13, change "$d_n'$" to --$d_a'$--
    line 38, change "$d_n'$" to --$d_a'$--

Column 7
    line 1, change "$\beta_0$" to --$\beta_0^\omega$--
    line 1, change "$\beta_0^\omega$" to --$\beta_0^{2\omega}$--
    line 65, change "$\omega_3 = 2\omega_{1.1}, \beta_2$" to --$\omega_3 = 2\omega_1.\beta_1, \beta_2$--

UNITED STATES PATENT OFFICE
CERTIFICATE OF CORRECTION

Patent No. 3,842,289    Dated October 15, 1974

Inventor(s) Amnon Yariv, et al

It is certified that error appears in the above-identified patent and that said Letters Patent are hereby corrected as shown below:

Continued---

Column 8
    line 62, Claim 1, before "said" delete "each"
    line 63, in the equation, change "$d_a + db$" to --$d_a + d_b$--

Column 9
    line 2, Claim 1, change "$n_2<n_3$" to --$n_2>n_3$--
    line 3, Claim 2, "ao" should be --as--
    line 10, after "in" insert --a--
    line 35, Claim 7, "ao" should be --as--

Column 10
    line 2, Claim 7, "opppsoite" should be --opposite--
    line 28, Claim 12, change "$d_a + db=A$" to --$d_a + d_b = A$--
    line 34, Claim 12, change "$n_2<n_3$ to --$n_2>n_3$--

Signed and sealed this 11th day of March 1975.

(SEAL)
Attest:

RUTH C. MASON
Attesting Officer

C. MARSHALL DANN
Commissioner of Patents
and Trademarks